June 29, 1965   A. W. McCLAY, JR   3,191,203
SCULLING SUPPORT FOR AN OAR
Original Filed May 15, 1961   5 Sheets-Sheet 1
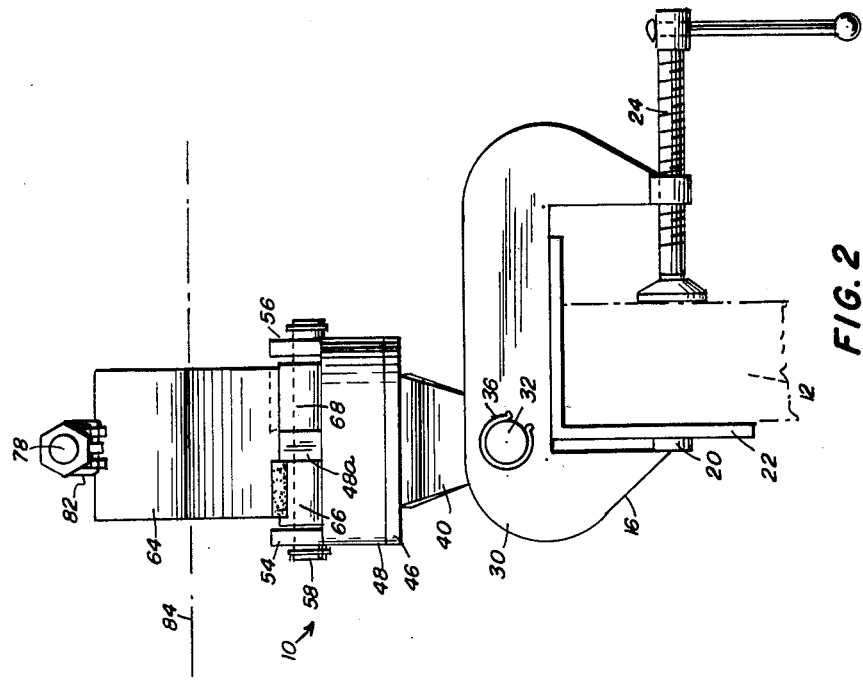
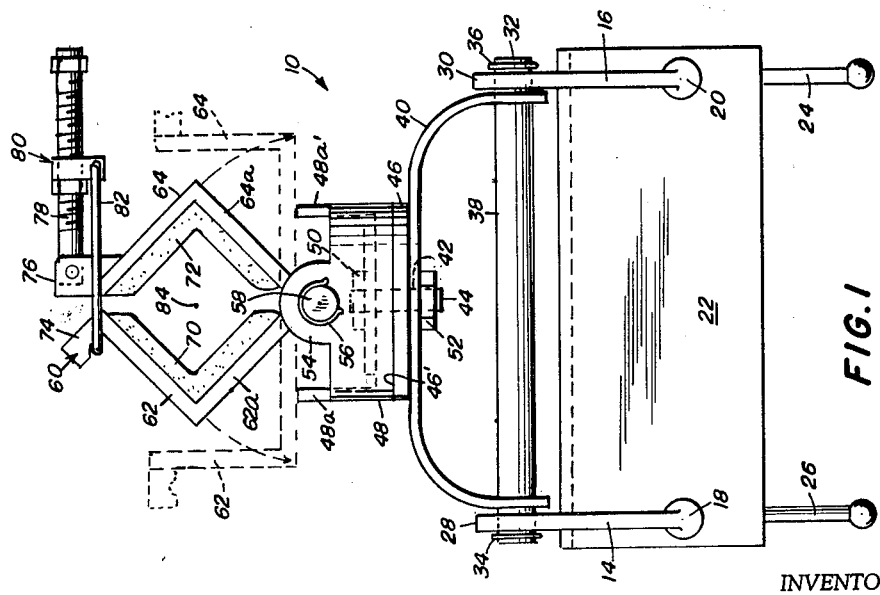
INVENTOR
ALEXANDER W. McCLAY, JR.
BY *Fisher Christen & Goodson*
ATTORNEYS June 29, 1965   A. W. McCLAY, JR   3,191,203
SCULLING SUPPORT FOR AN OAR
Original Filed May 15, 1961   5 Sheets-Sheet 2
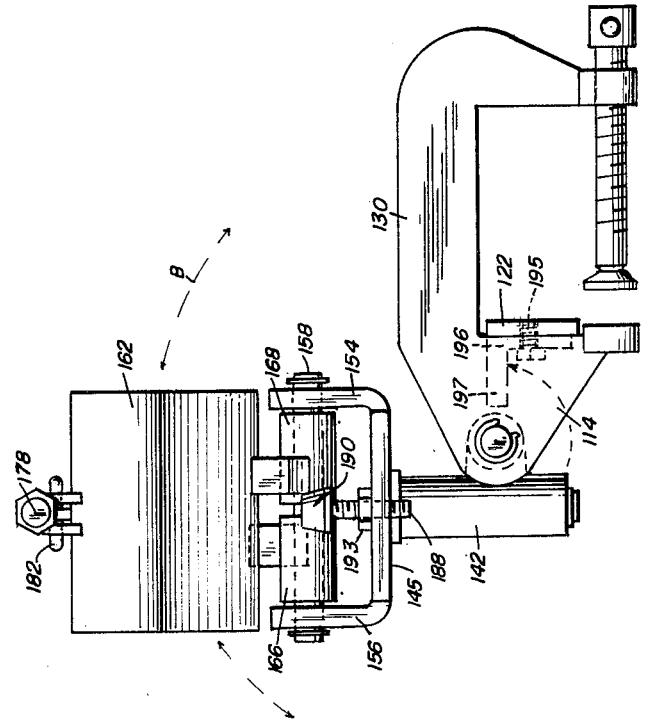
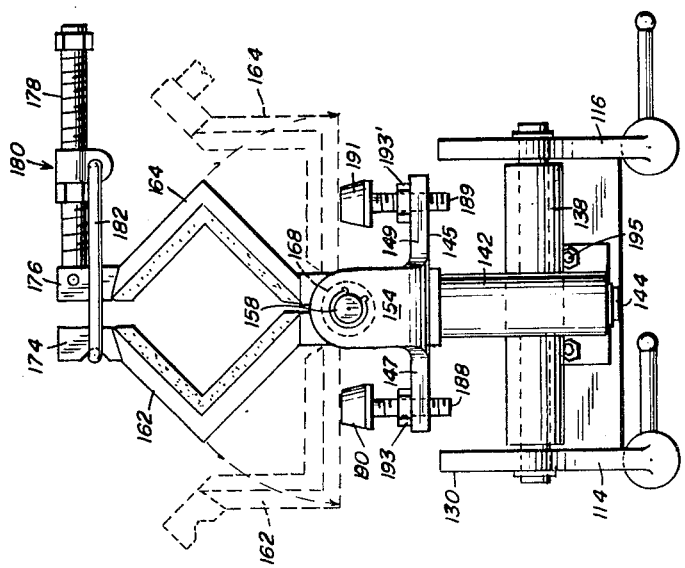
INVENTOR
ALEXANDER W. McCLAY, JR.
BY
ATTORNEYS June 29, 1965 A. W. McCLAY, JR 3,191,203
SCULLING SUPPORT FOR AN OAR
Original Filed May 15, 1961 5 Sheets-Sheet 3
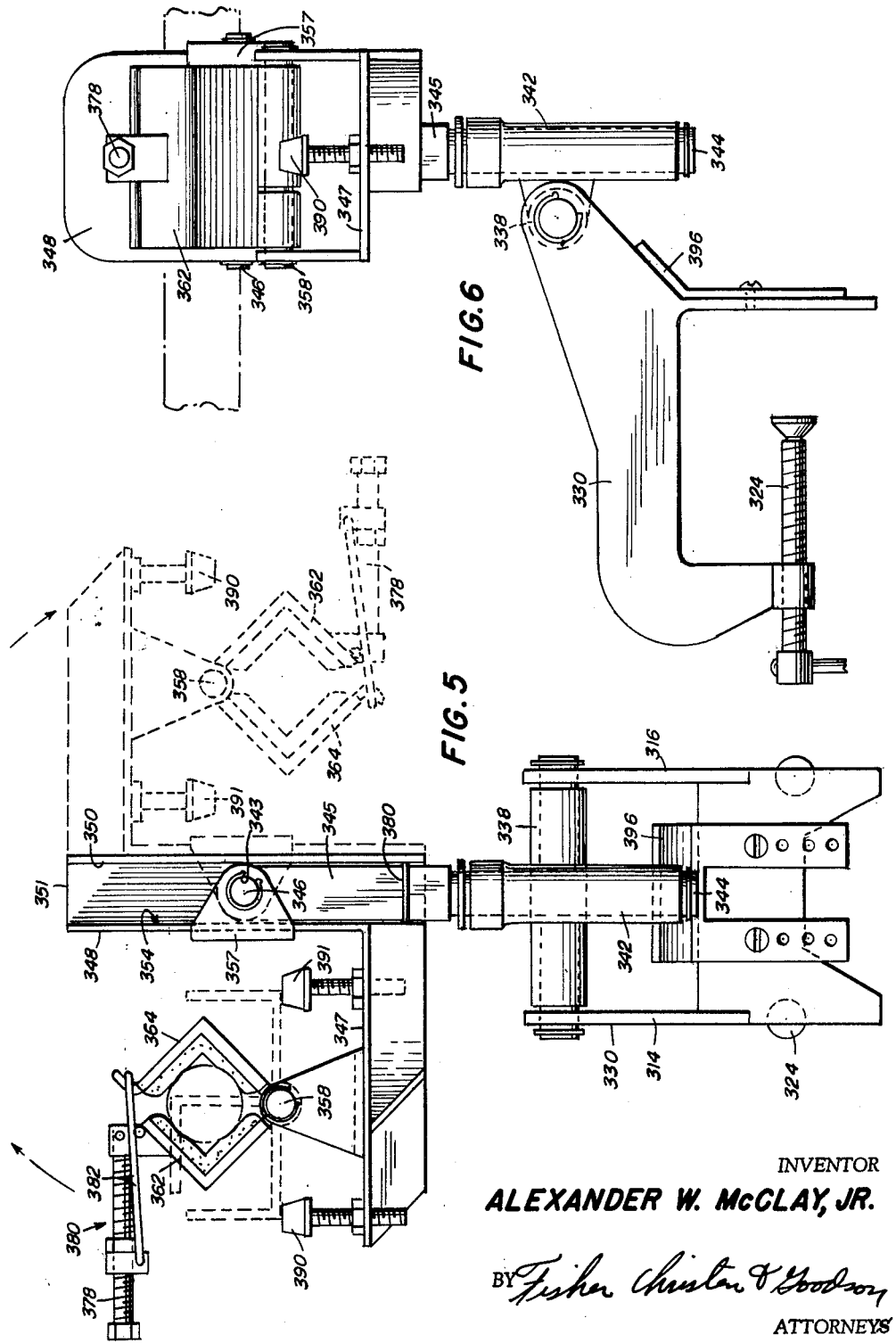
INVENTOR
ALEXANDER W. McCLAY, JR.
BY Fisher Christen & Goodson
ATTORNEYS

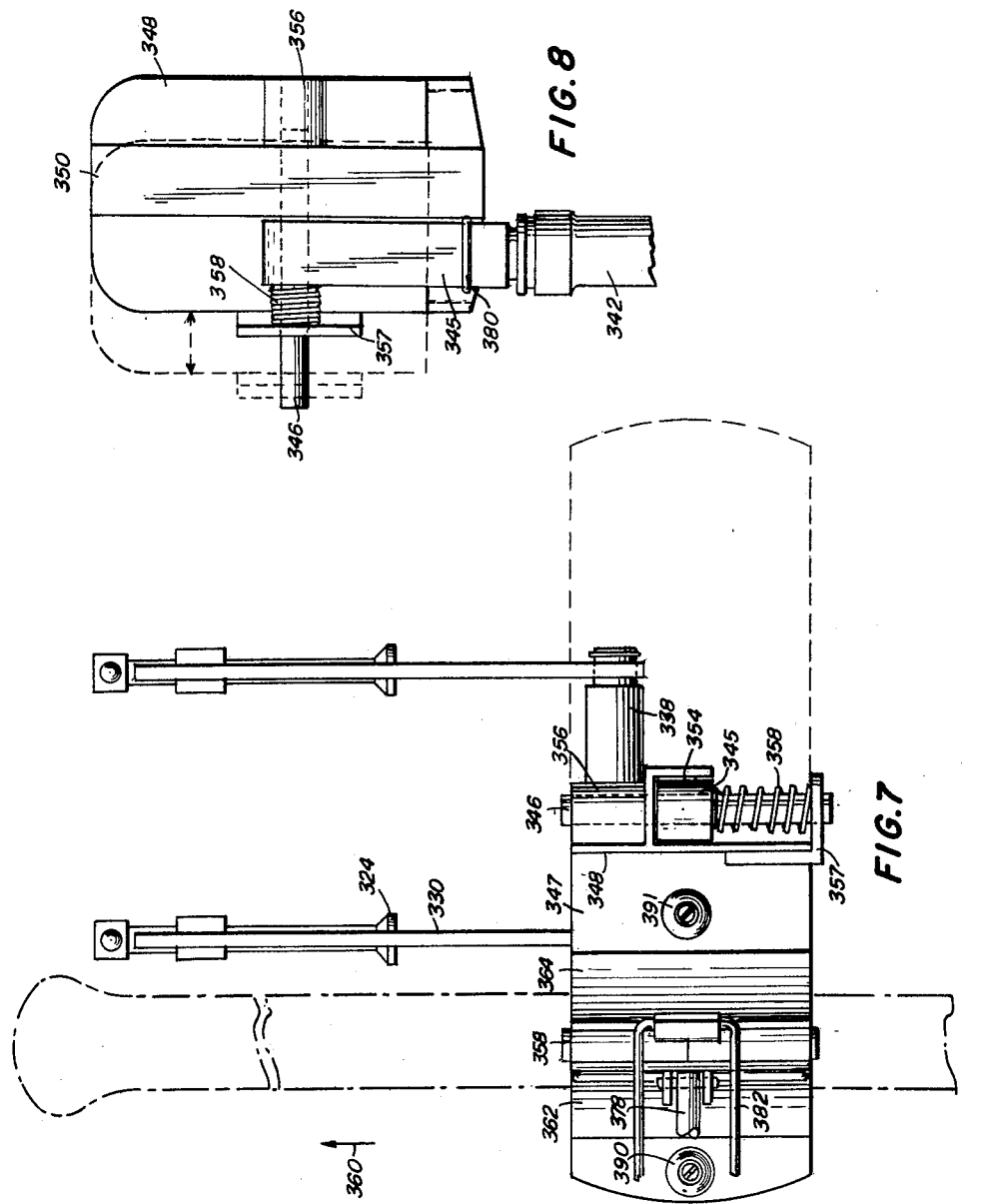

INVENTOR.
ALEXANDER W. McCLAY, JR.

United States Patent Office 3,191,203
Patented June 29, 1965

3,191,203
SCULLING SUPPORT FOR AN OAR
Alexander W. McClay, Jr., 28 Perry St.,
Petersburg, Va.
Continuation of application Ser. No. 109,994, May 15, 1961. This application Nov. 4, 1963, Ser. No. 322,275
18 Claims. (Cl. 9—26)

This is a continuation of application Serial No. 109,994, filed May 15, 1961, now abandoned.

This invention apertains to an improvement in a support for a manually operated propulsion means for small boats generally, and more specifically relates to an apparatus for supporting a paddle such that an oscillating movement transmitted to the paddle, about the support, automatically causes a proper feathering movement therein, as in sculling.

One object of the present invention is to provide such a support wherein the proper feathering and pitch attitude can be readily selected and adjusted for particular circumstances.

Another objective of the invention is to provide a self-feathering sculling device, simple in construction and of sufficient durability to withstand the particularly difficult environments in which it is to be used.

A further objective of one embodiment of the invention is to provide a device permitting a folding of parts whereby the device may be conveniently transported and stored in conventional tackle boxes and the like.

One principal objective of the invention is to provide means whereby the operator may effect reversal of the craft's movement with one simple motion, accomplished by a single hand.

A still further objective of this invention is to provide means whereby adjustments may be made in the working angle at which the paddle enters the water to account for the varying slopes of the transoms on different crafts, and idealize efficiency.

A further objective of the invention is to provide adjustment means whereby the pitch angles of the paddle or oar may be adjusted for the particular transverse pitch of the boat caused by the over-weighting of one side of the boat by personnel or other equipment, the device being mounted in a laterally sloped position due to the crown of the transom, list of the boat or other reasons.

A still further objective of the invention is to provide an apparatus of the type described wherein the desired movement transmitted or imparted to the paddle can be accomplished by an unskilled operator with the use of one arm, even though that operator may be in an awkward position and unable to observe the movement imparted.

A still further objective of the invention is to provide an improved sculling support which will positively secure an oar or paddle in a selected position, but which may be instantly released and adjusted when it is desired to alter the direction of thrust created by the opposing pitch angles of the blade.

A still further very important objective of this invention is to provide a paddle support which, when removed from the boat, does not require any permanent or semi-permanent structures to be left on the boat or paddle. Prior art supports which require clamps to remain on the oar when not used with the support, have a serious disadvantage in that the oar has other independent uses.

A further objective of the invention is to provide a support means wherein the paddle is securely supported to the boat, substantially outside thereof, but in a position for instant use by the boat occupant.

With the foregoing objects outlined and with other objects in view, which will appear as the description proceeds, the invention consists in the novel features herein-after described in detail, illustrated in the accompanying drawings and pointed out in the appended claims.

In the drawings:

FIG. 1 is an elevational view of one embodiment of the invention;

FIG. 2 is a side view thereof;

FIG. 3 is an elevational view of another embodiment of the invention;

FIG. 4 is a side view of the FIG. 3 embodiment;

FIG. 5 is an elevational view of still another embodiment of the invention showing a second position in dotted lines;

FIG. 6 is a side view of the FIG. 5 embodiment;

FIG. 7 is a plan view of the FIG. 5 embodiment; and

FIG. 8 is an enlarged partial end view of FIG. 7 showing the initial movement necessary before swinging the paddle-holding assembly to a position reversing the direction of thrust given by the paddle.

Figure 9:
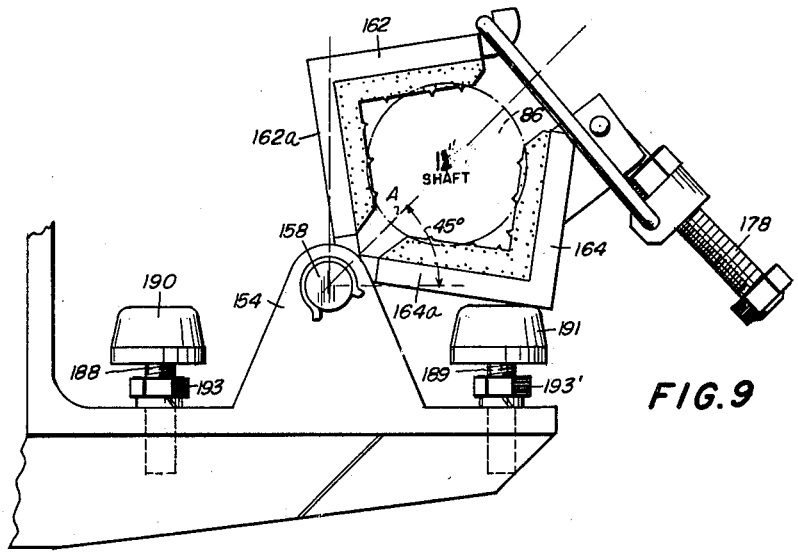
FIGS. 9 and 10 are diagrammatic showings of the cooperation between the several adjustment means.

Referring now to the drawings, wherein like numerals indicate like parts, the numeral 10 indicates the support structure of this invention. The structure is secured to a transom or stern 12 by way of two spaced parallel C-clamps 14 and 16. The abutting jaws 18 and 20 of the C-clamps are joined by a flat connecting bar 22. Opposing the bar 22 are a pair of conventional threaded clamp screws 24 and 26.

As seen best in FIG. 2, the transom 12 is securely grasped between bar 22 and screws 24 and 26. For ease of description, the transoms in all embodiments are shown as straight and vertical. Of course, most small craft have a sloping transom. However, it will be apparent to those skilled in the art that from the following description the support will operate on sloping and/or bowed transoms.

The base legs 28 and 30 of the C-clamps 14 and 16 respectively, are journaled to receive a horizontally disposed support pin 32 therebetween. The pin 32 may be kept in position through the use of conventional exterior snap rings 34 and 36. This pin is parallel to the top edge of the transom and therefore under normal conditions is transverse to the direction of travel and parallel to the water surface.

A sleeve 38 receives the pin 32 between the C-clamps and rotatably supports an inverted U-shaped bracket or frame 40. Of course, pin 32 can be journaled in bracket 40 without the use of sleeve 38. The bracket is journaled at 42 midway of its length to receive a pin 44. An apertured circular bearing plate 46 is secured to the bracket and is provided with a flat upper bearing surface 46′. Received on the bearing surface is an annular framing bracket 48 which taken in conjunction with bracket 40 constitute frame means. The pin 44 is journaled through each of these last mentioned members and has each of its ends threaded so as to receive nuts 50 and 52, such that the members may be secured with respect to each other. The pin 44 provides an axle about which the framing bracket 48 rotates with respect to surface 46.

A pair of integral upright opposing lugs 54 and 56 are spaced about the top surface of annular bracket 48. The lugs have opposing journals to receive a third pin 58 which pivotally supports a paddle clamp 60. The paddle clamp is comprised of a pair of angle irons 62 and 64 respectively having depending sleeves 66 and 68 rotatably mounted about the pin 58. Therefore, the gripping irons 62 and 64 are hingedly secured to the pin 58.

The inner surfaces of the angle irons are respectively coated with resilient linings 70 and 72 and on their ends, opposite sleeves 66 and 68, have a lug 74 and a yoke 76 extending therefrom. The yoke 76 pivotally supports a threaded pin 78 of the adjustable toggle mechanism 80.

As will be understood, the retaining strap 82 of the toggle mechanism may be released from lug 74 by merely swinging pin 78 counter-clockwise, as viewed in FIG. 1, and swinging the strap above the vicinity of the lug.

For purposes of clarity, FIGS. 1 and 2 have been shown with the bracket 40 substantially in the same plane as transom 12. In this position a paddle grasped between the clamping members 62 and 64 would be substantially parallel to the water surface. In use, of course, the bracket 40 would be pivoted counter-clockwise as seen in FIG. 2 until a paddle supported along the central axis 84 of the paddle clamp assumes any position from 20° to vertical with respect to the water surface.

In operation, an oar is secured between the clamping members 62 and 64 with its longitudinal axis substantially coincident with the longitudinal axis 84. The blade end of the oar (to the left in FIG. 2) may be dipped into the water by pivoting bracket 40 counter-clockwise about axis 32. As a back and forth motion is imparted to the paddle (not shown) from the handle end thereof, the paddle will oscillate about pin 44 through bearing surfaces 46 and 48, and rock from side to side about the pin 58. Therefore, as will be apparent to those skilled in the art, as the paddle pivots about pin 44 the rocking motion about pin 58 will position the blade in the water so that forward thrust is achieved in each direction by having the opposing blade surfaces pushing the water rearwardly as the oar is moved thwartwise.

In the embodiment shown in FIGS. 1 and 2, the rocking motion about 58, is limited by the top surfaces of lugs 48a and 48a' at points spaced 90 degrees from lugs 54 and 56. Excellent performance is accomplished in this embodiment by the large bearing surfaces between bearing plate 46 and bracket 48.

In review, it can be seen that between the point of attachment to the boat and the paddle clamp there is a first axis (pin 32) of rotation transverse to the direction of travel, a second axis of rotation (pin 44) normal to said first axis, and a third axis (pin 58) normal to said first and second axes. The working angle at which the paddle is received in the water is accomplished by rotation about the first axis, the length of stroke is determined by the amount of rotation about the second axis, and the reverse pitch on alternate strokes is accomplished through the rotation about the third axis. The opposing pitch angles desired in the blade of the paddle, of course, is varied by rotating the paddle about its longitudinal axis prior to securing the toggle assembly. The placing of pivot 44 between the pivot 32 and the pivot 58 provides an arrangement whereby the pitch remains constant for any angle of operation at which the oar enters the water.

Another embodiment of the invention is shown in FIGS. 3 and 4. Basically, the operation is the same as that described for FIGS. 1 and 2 with the exception that the bearing plate and annular brackets 46 and 48 have been replaced with a pin and sleeve assembly, and a pair of leg members have been added to support a pair of adjustable resilient stops.

Corresponding even numbered numerals in the one-hundred series are used on FIGS. 3 and 4 to designate elements substantially identical to those previously described. Those elements wherein the embodiment differ are designated by odd-numbered numerals. In this embodiment a pair of C-clamps 114 and 116 support a pin 132 journaled therebetween. Rotatable about the pin 132 is a sleeve 138 having a bracket sleeve of frame 142 welded thereto at right angles to pin 132. Rotatably received within sleeve 142 is a pin 144 terminated at its upper end by a yoke 145 having opposing upright lugs 154 and 156. Pin 144 supports, at a point above sleeve 142, a pair of horizontally extending legs 147 and 149. Supported between lugs 154 and 156 is a pin 158 which supports a pair of angle iron jaw clamp members 162 and 164. The sleeve or frame 142 together with the lugs 154 and 156 and C-clamps 114 and 116 constitute frame means for supporting the paddle clamping structure. In all material respects the clamp and toggle means are similar to the corresponding clamps in the FIGS. 1 and 2 embodiment.

This device is uniquely suitable as a safety device. In the event one of a pair of oars is lost, or in the event of a power failure in a motor driven boat, a single oar can be used to propel an operator over long distances without tiring. The support is easily stored and transported. Referring to arrow B in FIG. 4, it can be seen that the oar clamping structure can be folded to a position in between C-clamps 114 and 116.

Figure 10:
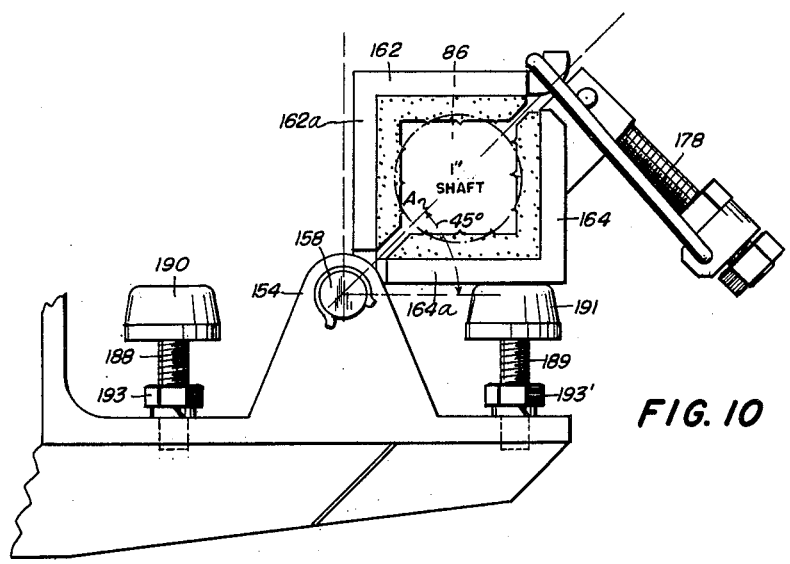

A pair of threaded screws 188 and 189 are threadedly received at right angles by legs 147 and 149 respectively. A pair of resilient stops 190 and 191 are attached to the upper surface thereof. FIGS. 9 and 10, drawn to scale, show the importance and cooperation between the adjustable toggle mechanism and the adjustable stops 190 and 191. This combined structure permits the support to accept oars having varying diameters while maintaining correct pitch settings. FIG. 9 shows a paddle having a 1¼ inch diameter, and FIG. 10 shows a paddle having a 1 inch shaft. Assuming that a pitch setting of 45 degrees were desired in each instance, the differences in FIGS. 9 and 10 show the relatively great amount of adjustment necessary. The elongated screw 178, in cooperation with the elongated pins 188 and 189, permits this wide range of adjustment. It is apparent that if stops 190 and 191 were not adjustable, the pitch angle of the paddle would vary considerably when using paddles with only slightly different diameters. Variation in shaft size is true of oars to an even greater extent due to various lengths of oars and consequent differences in shaft sizes, taper of shafts and its effect as to varying diameters along length of shaft at which lock might be attached and to manufacturing differences. Also the tapered shafts of oars, and the point along the shaft at which operators might clamp it will cause variations. The height of stops 190 and 191 are adjustable by rotating the screws the proper amount. This provides a means to limit the amount of rocking in the clamp members in a particular navigational circumstance. For instance, if the craft is tilted about its longitudinal axis, due to the operator sitting near the port or starboard side, the stops may be individually raised or lowered to vary the pitch angles sufficiently to oppositely impart an equal thrust on both the back and forth strokes of the paddle. In order to impart the proper pitch angles to the oar, the shaft clamps are loosened and the paddle is rotated somewhat. This is easily accomplished by merely raising the toggle latch slightly, adjusting the pitch, and returning the toggle to its lock position. With leg 164a of the clamp member 164 resting against adjustment stop 191, the plane of the paddle blade can be made to be in the same plane (45° to the desired direction of travel) as line A as shown in FIG. 9. A pair of locking nuts 193 and 193' are provided to secure the stops at selected heights.

For a less tiring operation, the invention provides structure whereby the working angle at which the paddle is used or stroked will remain substantially constant. This advantage is obtained by mounting an adjustable lug on the C-clamp assembly to engage the bottom portion of the sleeve 142 and thereby limit its rotation about pin 132. The abutment relation relieves the operator from the necessity of overcoming the upward or rearward tilt of the paddle occasioned by the blade being urged in a direction under the boat, e.g., the direct result of the forward thrust itself.

For these purposes the bar 122 is apertured between the C-clamps to receive one or more locking screws 195. The locking screws secure an angle iron 196 to plate 122. The angle piece 196 has a stop lug 197 extending outwardly therefrom. As can be seen by referring to FIG. 4, the bottom of sleeve 142 strikes lug 197 as the support assembly is pivoted about the pin 132. The relative height of the lug will determine the amount of pivoting permitted. A selection is permitted by providing a plurality of apertures at different heights along leg 196. Since the bulk of the weight of the oar is to the left, as viewed in FIG. 4, and due to the resistance of the water (forward thrust of paddle blade) during the sculling stroke, the normal position of sleeve 142 will be against the lug 197.

Another embodiment of the invention is shown in FIGS. 5 through 8. In this embodiment the structure between the C-clamps 314 and 316 and sleeve or frame 342 is substantially identical functionally to that shown in FIGS. 3 and 4. An arrangement of an adjustable stop lug 396 to contact sleeve 342 is provided which is similar to the functioning of stop lug 197. Likewise, the paddle clamping jaws 362 and 364 and the toggle assembly 380 are identical to that of previous embodiments. However, the third embodiment provides an L-shaped bracket whereby the oar support assembly may be turned upside down (approximately 180°) thereby reversing the thrust of the paddle blade from forward to rearward without making any adjustment of the paddle within the locking jaws.

The identical structural elements from the C-clamps to the second rotatable sleeve, and from the rocking pin to the adjustable stop lug have been designated by similar numerals in the three hundred series. The remaining numerals odd or even are applied independently of the previous embodiments.

In this embodiment the rotatable pin 344, extends above sleeve 342 in the form of an arm 345 having a squarish cross-section. At its upper end, the arm 345 is apertured at 343 and fixedly receives a pin 346.

An L-shaped bracket is comprised of two legs 347 and 348. The sleeve or frame 342, along with the arm 345 and leg 347 comprise frame means for supporting the paddle clamping structure. Leg 347, as best seen in FIG. 5, directly supports the paddle clamping structure and adjustable stops which are operatively identical to the FIGS. 3 and 4 embodiments. A length of angle iron 350 is welded along the longitudinal length of the leg 348, and forms therewith a channel pocket 354 to receive the arm extension 345.

A lug 357 is secured to the lateral edge of the leg 348 and is apertured to slidably receive the pin 346. Angle iron 350 has a mating aperture in plate 351 to also receive the pin. A journal 356 is provided to reinforce this last mentioned aperture. As seen best in FIG. 7, angle iron 350 and lug 357 are spaced a sufficient distance from each other to permit arm 345 to slide out of pocket 354. A coil 358 around pin 346, between the arm and one lug, is provided to spring bias the arm into the channel 354.

The force necessary to overcome bias of spring 358 can be transmitted to the L-shaped bracket 347 by merely exerting a pulling force on the paddle in the direction of arrow 360 in FIG. 7. When the solid line position (FIG. 8) of leg 348 is reached (spring 358 compressed) bracket 347 is free to rotate about pin 346. When arm 345 is aligned with pocket 354, the force is released and the spring will again urge the arm into the pocket. The L-shaped bracket 347 will then be in the dotted line position of FIG. 5. Thus it may be appreciated that the structure of FIG. 5 actually presents a two-section frame for the paddle clamping structure wherein one section is comprised of the transom clamping structure 330, and the sleeve or frame 342 with the other section being that structure directly supporting the paddle clamp pivot axis 358.

In this dotted line position, the operation of the support will be the same as before with the exception that the blade surface of the paddle will work oppositely as in the full line position. Therefore, the craft's direction of travel is reversed when a similar motion is imparted to the paddle. A resilient band 380' is provided to reduce noise of changeover from forward to reverse position of bracket, e.g. bracket impacting against pin 345 by keeping a snug fit between the pocket 354 and the arm 345.

From FIG. 5 it may be seen that the paddle clamp axis at the center of jaws 362 and 364 and the paddle clamp pivot axis 358 reverse their positions relative to the boat to provide the forward and rearward traveling motion. It may be appreciated that the structure of FIG. 6, when in operative relation with the pin 344 against the thrust abutment 396, deploys the paddle clamp axis in a direction outward of the paddle clamp pivot axis 358 for forward motion and in a direction inboard of the pivot axis 358 for rearward motion (as seen in dotted outline in FIG. 5).

As used herein, the "feathering angle" is the total angle through which the blade rocks and has to do with thrust obtained versus effort expended, and is determined by shaft size and position of stops 190 and 191. The "pitch angles" are those two angles (could not conceivably be exactly equal) formed by the plane of the blade (when rotatably positioned with its clamp against stop 190 or 191) and a plane through the center-line of the paddle and normal to a vertical plane through the longitudinal center-line of the boat. The two pitch angles are adjusted by slightly rotating paddle shaft within its clamp (162, 164) which adjustment increases one pitch angle while decreasing the other and in so doing controls direction of thrust. Thus, when the paddle support is offset from the center-line of the boat (as it invariably will be), the pitch angles will be varied to direct the thrust toward the center of resistance of the boat.

While I have shown and described what is thought now to be the preferred forms of this invention, yet it is apparent that the same are susceptible of other embodiments and combinations. Therefore, it is to be understood that the foregoing disclosure is to be regarded as illustrative only and that it is not my intention to limit myself to the particular embodiments and combination shown except as hereinafter claimed.

I claim:

1. A paddle support for securing a paddle to a boat for a sculling operation, comprising in combination a base for attachment to the stern of said boat, a frame, first pivot means pivotally mounting said frame on said base for movement about a first axis, a paddle holder, second pivot means pivotally mounting said holder on said frame for movement about a second axis normal to and offset from said first axis; said paddle holder including a paddle clamp and a third pivot means pivotally mounting said clamp on said holder for movement about a third axis at right angles to said second axis and said first axis, means for adjusting the paddle clamp to accommodate various size paddle shafts, said paddle holder including independently adjustable means for limiting the degree of clamp pivoting about said third axis and compensating for adjustment of the paddle clamp to maintain equal feather angles for the various size shafts accommodated.

2. A paddle support for securing a paddle to a boat for propelling the boat through the water comprising in combination a base, means for detachably securing said base to the stern of said boat, a frame, first pivot means pivotally mounting said frame on and centrally of said base for movement about a substantially horizontal first axis transverse to the direction of propulsion, a paddle holder means, second pivot means pivotally mounting said holder means on and centrally of said frame for movement about a second axis at right angles to said first axis; said paddle holder including a paddle clamp and a third pivot means pivotally mounting said clamp on and centrally of said holder means for movement about a third axis at right angles to said second axis and said first axis, said second pivot means including adjustable means for limiting the degree of pivoting about said third axis.

3. A paddle support for securing a paddle to a boat for a sculling operation comprising a base, a frame, first pivot means pivotally mounting said frame on said base for movement about a first axis, a paddle holder, second pivot means pivotally mounting said holder on said frame for movement about a second axis at right angles to said first axis; said paddle holder including a paddle clamp, a bracket, and third pivot means pivotally mounting said clamp on said bracket for movement about a third axis at right angles to said second axis and said first axis; said second pivot means including reversing means, and locking means for fixing said bracket to said second pivot means for movement therewith in a forward position on one side of said second pivot means and in rearward position on the other side of said second pivot means.

4. A paddle support for securing a paddle to a boat for a sculling operation comprising a base, a frame, first pivot means pivotally mounting said frame on said base for movement about a first axis, a paddle holder, second pivot means pivotally mounting said holder on said frame for movement about a second axis at right angles to said first axis; said paddle holder including a paddle clamp, an L-shaped bracket, and third pivot means pivotally mounting said clamp on one leg of said L-shaped bracket for movement about a third axis at right angles to said second axis and said first axis; said second pivot means including pivot means on the other leg of said bracket having an axis parallel to said third axis and intersecting said second axis; and means for locking said bracket to said second pivot means for movement therewith in a forward position on one side of said second pivot means and in rearward position on the other side of said second pivot means.

5. A paddle support for securing a paddle to a boat for a sculling operation comprising a base, a frame, first pivot means pivotally mounting said frame on said base for movement about a first axis, a paddle holder, second pivot means pivotally mounting said holder on said frame for movement about a second axis at right angles to said first axis; said second pivot means comprising a shaft rotatable about said second axis; an arm longitudinally extending from said shaft, an L-shaped bracket, a first leg of said bracket connected to said arm, a second leg of said bracket, a paddle clamp, third pivot means pivotally mounting said clamp on said second leg for movement about a third axis at right angles to said second axis and said first axis; said second pivot means including a further axis pivot means pivotally mounting said first leg on said arm on an axis parallel to said third axis and intersecting said second axis, and means for holding said first leg against said arm for movement therewith in a forward position on one side of said second pivot means and in rearward position on the other side of said second pivot means.

6. A paddle support for sculling operations comprising, a base for attachment to the stern of a boat, a frame, first pivot means pivotally mounting said frame on said base for movement about a horizontal first axis, substantially parallel to said stern, a paddle holder means, second pivot means pivotally mounting said holder means on and centrally of said frame for movement about a second axis at right angles to and offset from said first axis; said paddle holder means including a paddle clamp and a third pivot means pivotally mounting said clamp on and centrally of said holder means, means for adjusting the paddle clamp to accommodate various size paddle shafts, adjustable means against which the clamp abuts to compensate for any adjustment of the paddle clamp whereby equal feather and pitch angles are obtained with the same paddle orientation regardless of paddle shaft size.

7. A support for a paddle adapted for sculling comprising a paddle clamp; frame means supporting the paddle clamp for universal movement relative to a boat to be propelled through first, second and third pivot axes; a thrust abutment for the frame means adjustably fixed relative to the boat to limit the universal movement about the first pivot axis; said frame means mounting the paddle clamp for movement about the second pivot axis in a plane normal thereto; and said second pivot axis being disposed at an angle less than 90° to the water in the limited position to cause said plane to intersect the water whereby the paddle movement is confined to said plane thereby transmitting thrust to the boat.

8. A support for a paddle adapted for sculling comprising a paddle clamp adapted to grip a paddle; a two-section frame means capable of providing universal movement through a plurality of axes including a paddle clamp pivot axis and adapted for attachment at one section thereof to a boat to be propelled, the other section of the frame means supporting the paddle clamp with the paddle axis in a direction outboard of said pivot axis; and means permitting reversal of the other section of the frame to deploy the clamp with the paddle axis in a direction inboard of said pivot axis.

9. A support for a paddle adapted for sculling through push and pull strokes comprising a paddle clamp; frame means for supporting the paddle clamp for universal movement relative to a boat to be propelled including an axis about which the paddle clamp is pivotable; separate means carried by the frame means to abut the clamp for establishing separate positions on opposite sides of the axis for the clamp for the push and pull strokes, respectively; said separate means being independently adjustable to provide control of the blade angle of the paddle.

10. A support for a paddle adapted for sculling through push and pull strokes comprising a paddle clamp; frame means supporting the paddle clamp for movement relative to a boat to be propelled with respect to three mutually orthogonal axes including an axis about which the paddle clamp is pivotable; separate adjustable stop means interposed between the frame means and the clamp for establishing separate spaced apart positions on opposite sides of the axis for the clamp for the push and pull strokes respectively.

11. A support for a paddle adapted for sculling through push and pull strokes comprising a paddle clamp; said clamp including a pin and a pair of paddle gripping irons hingedly supported by the pin; frame means for supporting the paddle clamp at the pin for movement relative to a boat to be propelled about three mutually orthogonal axes including an axis through said pin about which the paddle clamp is pivotable; and means for establishing frame means to clamp spacing at separate positions on opposite sides of the axis for the clamp for the push and pull strokes respectively.

12. A support for a paddle adapted for sculling through push and pull strokes comprising a paddle clamp; frame means for supporting the paddle clamp for universal movement relative to a boat to be propelled including an axis about which the paddle clamp is pivotable to separate positions on opposite sides of the axis for the clamp; separate adjustable stop means for adjusting the position of the clamp in each of said separate positions to provide control of the blade angle of the paddle.

13. A support for securing a paddle to a boat for sculling through push and pull strokes comprising a paddle clamp; frame means supporting the paddle clamp for sculling movement relative to a boat to be propelled; separate means carried by the frame means to abut the clamp for establishing separate spaced apart positions for the clamp for the push and pull strokes, respectively; a thrust abutment for the frame means to limit the movement in the longitudinal direction of the boat, whereby the movement of the paddle axis through the water is limited to a plane transverse to the boat and fixedly spaced therefrom, thereby transmitting the force component in the direction of the boat to the boat.

14. A support for securing a paddle to a boat for sculling through push and pull strokes comprising a paddle clamp; frame means supporting the paddle clamp for movement relative to a boat to be propelled about three mutually orthogonal axes; separate means carried by the frame means interposed between the frame means and the clamp for establishing separate spaced apart positions relative to one of said axes for the clamp for the push and pull strokes, respectively; a thrust abutment for the frame means to limit the movement in the longitudinal direction of the boat about another of said axes; said frame means limiting the movement of said one of the axes to a plane normal to the third one of said axes to confine the movement of the paddle axis through the water to said plane transversely of the boat and fixedly spaced therefrom as determined by the thrust abutment, thereby transmitting the force component in the direction of the boat to the boat.

15. A support for securing a paddle to a boat for sculling through push and pull strokes comprising a paddle clamp; frame means supporting the paddle clamp for limited universal movement relative to a boat to be propelled; separate means interposed between the frame means and the clamp in abutting relation thereto for establishing separate spaced apart positions for the clamp for the push and pull strokes, respectively; a thrust abutment for the frame means to limit the movement in the longitudinal direction of the boat; said frame means confining the paddle clamp movement to a plane transverse of the boat while the paddle is in the water and spaced therefrom so long as the thrust abutment limits the frame movement to transmit the force component in the direction of the boat to the boat.

16. A support for a paddle adapted for sculling comprising a paddle clamp adapted to grip a paddle; a two-section frame means capable of providing multi-directional movement through a plurality of axes including a paddle clamp pivot axis and adapted for attachment at one section thereof to a boat to be propelled, the other section of the frame means supporting the paddle clamp with the paddle axis in an uprising direction relative to said pivot axis; and means permitting reversal of the other section of the frame to deploy the clamp with the paddle axis in a direction depending relative to said pivot axis.

17. A paddle support for securing a paddle to a boat for a sculling operation, comprising in combination a base for attachment to the stern of said boat, a frame, first pivot means pivotally mounting the frame on the base for movement about a first axis, a paddle holder, second pivot means pivotally mounting the holder on the frame for movement about a second axis normal to the first axis; the paddle holder including a paddle clamp and a third pivot means pivotally mounting the clamp on the holder for movement about a third axis at right angles to the second axis and the first axis, means for adjusting the paddle clamp to accommodate various size paddle shafts, separate spaced apart means interposed between the clamp and holder to define spaced apart positions for the clamp for limiting the degree of clamp pivoting about the third axis through clamp to separate means to frame contact thereby compensating for adjustment of the paddle clamp to maintain equal feather angles for the various size shafts accommodated.

18. A paddle support for securing a paddle to a boat for a sculling operation, comprising in combination a base for attachment to the stern of said boat, a frame, first pivot means pivotally mounting the frame on the base for movement about a first axis, a paddle holder, second pivot means pivotally mounting the holder on the frame for movement about a second axis normal to the first axis; the paddle holder including a paddle clamp and a third pivot means pivotally mounting the clamp on the holder for movement about a third axis at right angles to the second axis and the first axis, the paddle clamp comprising a pair of opposed gripping irons hingedly connected together to define the third axis, means for adjusting the spacing between the paddle clamp irons to accommodate various size paddle shafts; said paddle holder including separate means for fixing the distance between the clamp and holder in each of two spaced apart positions, respectively lying on opposite sides of the third axis, for limiting the degree of clamp pivoting about the third axis and compensating for adjustment of the paddle clamp to maintain equal feather angles for the various size shafts accommodated.

References Cited by the Examiner
UNITED STATES PATENTS

| | | | |
|---|---|---|---|
| 826,058 | 7/06 | Pendleton | 9—26 |
| 1,569,841 | 1/26 | Mann | 269—228 |
| 2,324,311 | 7/43 | McKelvey | 9—26 |
| 2,382,721 | 8/45 | Hosack | 9—26 |
| 2,887,918 | 5/59 | Benson | 269—228 |

FERGUS S. MIDDLETON, *Primary Examiner.*